Feb. 28, 1939. E. H. LEHMAN 2,148,565
FRICTION SHOCK ABSORBING MECHANISM
Filed March 20, 1936 2 Sheets-Sheet 2
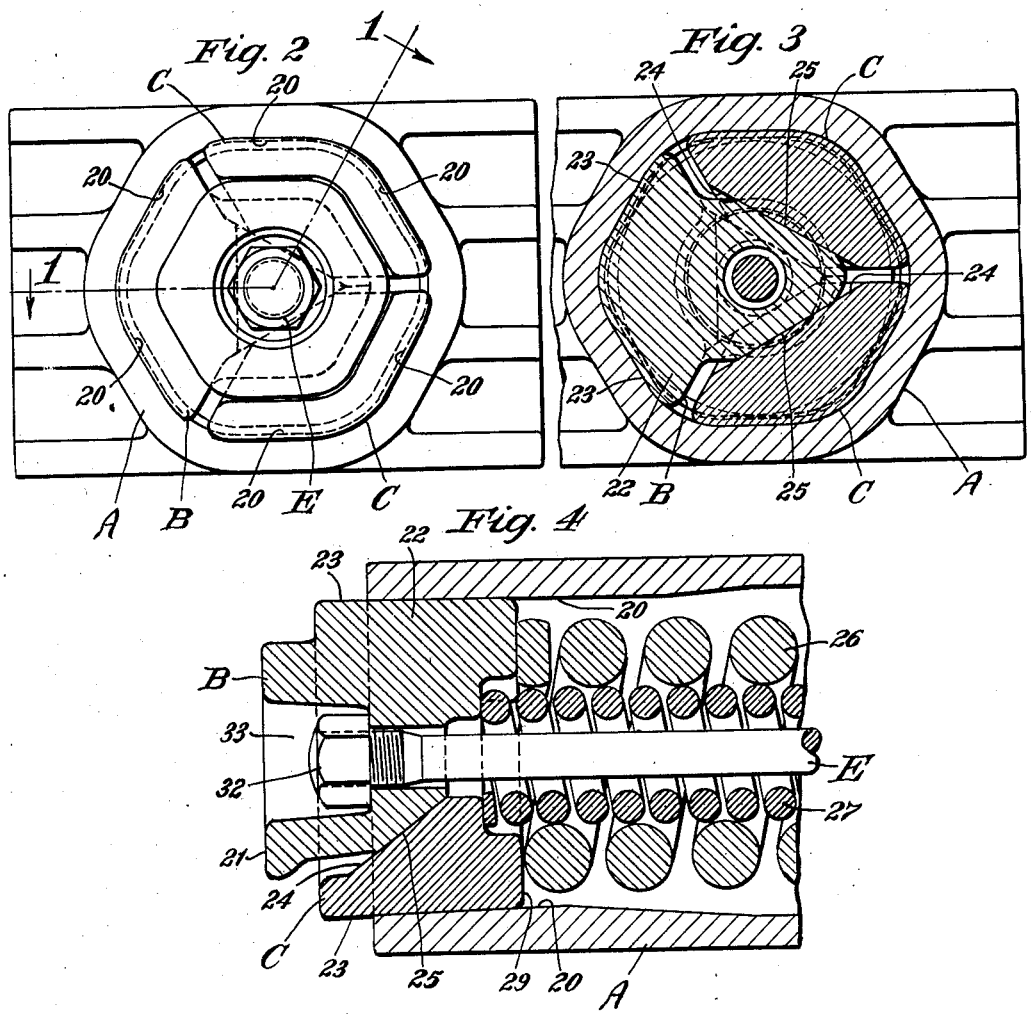
Inventor
Edward H. Lehman
By Henry Fuchs
Atty.

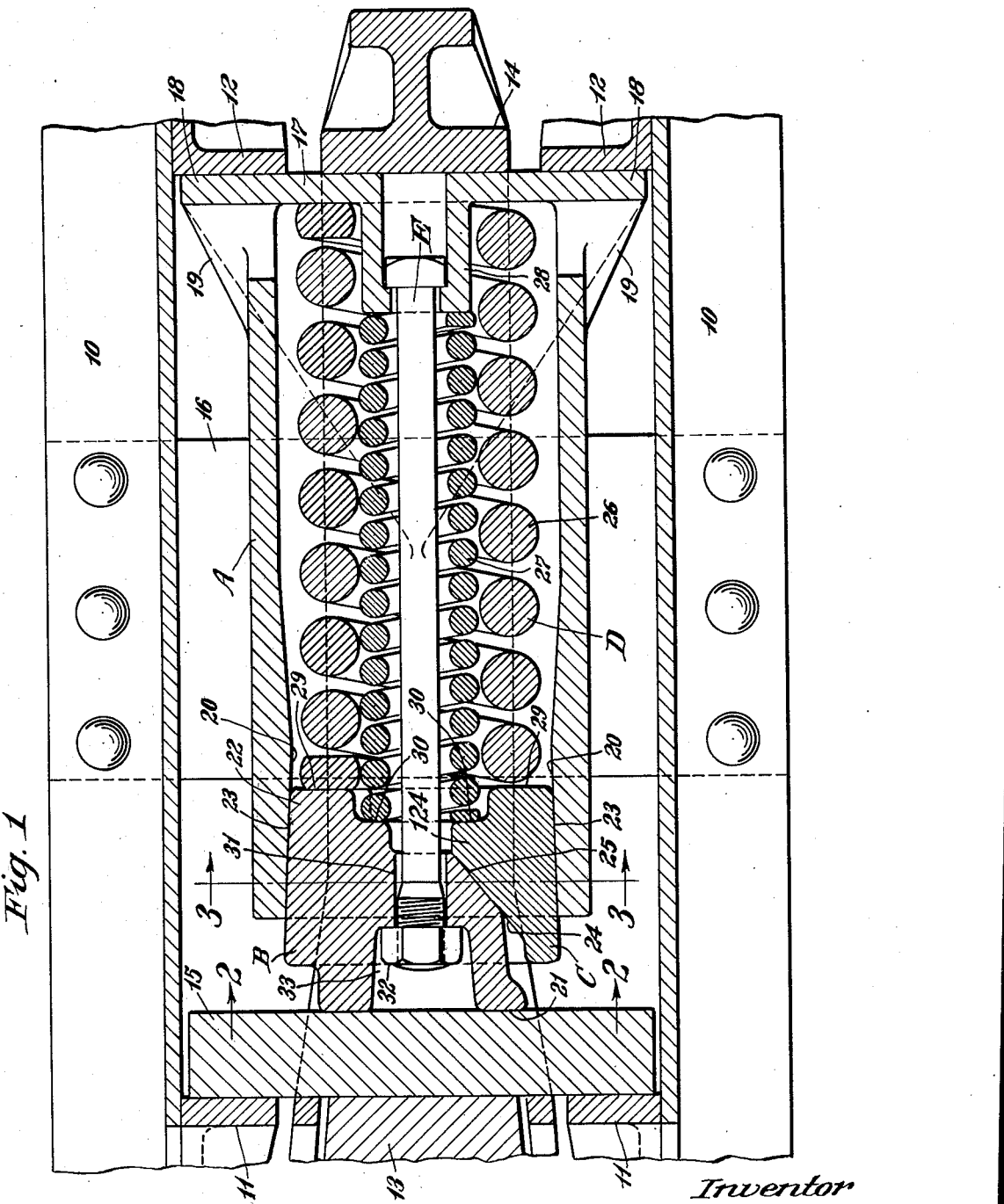

Patented Feb. 28, 1939

2,148,565

UNITED STATES PATENT OFFICE 2,148,565

FRICTION SHOCK ABSORBING MECHANISM

Edward H. Lehman, Chicago, Ill., assignor to W. H. Miner, Inc., Chicago, Ill., a corporation of Delaware Application March 20, 1936, Serial No. 69,847

5 Claims. (Cl. 213—32)

This invention relates to improvements in friction shock absorbing mechanisms.

One object of the invention is to provide an efficient friction shock absorbing mechanism, especially adapted for railway draft riggings, comprising a friction casing and a friction system cooperating with the casing, the friction system being in the form of an expandible clutch comprising a plurality of friction shoes having frictional engagement with interior friction surfaces of the casing, so arranged and designed that the expanding force transmitted to the casing is properly distributed to equalize the strain on the casing walls, wherein the pressure transmitting spreading means of the clutch is combined as a unit with one of the shoes, thereby reducing the number of clutch parts required and greatly simplifying the construction.

Another object of the invention is to provide a friction shock absorbing mechanism comprising a friction casing and spring resisted friction clutch means comprising a plurality of friction elements having frictional engagement with the casing and having their movement inwardly of the casing resisted by spring means, wherein one of the friction elements functions as the pressure transmitting spreading member of the clutch means for expanding the latter.

Other objects of the invention will more clearly appear from the description and claims hereinafter following.

In the drawings forming a part of this specification, Figure 1 is a horizontal sectional view through the underframe structure of a railway car, illustrating my improved friction shock absorbing mechanism in connection therewith, the section through the shock absorbing mechanism proper being taken on two intersecting planes at 120 degrees to each other and corresponding substantially to the line 1—1 of Figure 2. Figure 2 is a front, elevational view of my improved shock absorbing mechanism, as indicated by arrows 2—2 in Figure 1. Figure 3 is a transverse, vertical, sectional view, corresponding substantially to the line 3—3 of Figure 1. Figure 4 is a view similar to Figure 1, illustrating another embodiment of the invention, the underframe structure shown in Figure 1 being omitted and the rear portion of the friction shock absorbing mechanism being broken away.

Referring first to the embodiment of the invention illustrated in Figures 1, 2, and 3, 10—10 designate spaced channel-shaped center or draft sills of a railway car underframe, to the inner sides of which are secured the usual front and rear stop lugs 11—11 and 12—12. The inner end portion of the coupler shank is designated by 13 and a hooded yoke 14 of well-known form is connected thereto. My improved shock absorbing mechanism proper and a front main follower 15 are disposed within the yoke and the yoke in turn is supported by a detachable saddle plate 16 fixed to the bottom flanges of the draft sills 10.

My improved shock absorbing mechanism comprises broadly a combined friction shell and spring cage in the form of a casing A; a combined wedge and friction shoe B; a pair of friction shoes C—C; a main spring resistance D; and a retainer bolt E.

The casing A, which forms the combined friction shell and spring cage, is of substantially hexagonal cross section, having the friction shell section formed at the forward end and the spring cage section at the rear end thereof. The casing A is closed at the rear end by a transverse wall 17 which is extended laterally outwardly beyond the side walls of the casing, thereby providing flanges 18—18 which cooperate with the rear stop lugs 12—12 in the manner of a rear follower. The flanges 18—18 are preferably reenforced by webs 19—19 formed integral with the walls of the casing and said flanges. The friction shell section of the casing A is provided with six interior, substantially flat, inwardly converging friction surfaces 20—20, which are spaced symmetrically about the longitudinal axis of the mechanism.

The combined wedge and friction shoe B is in the form of a block having a transverse outer end face 21 bearing on the front follower 15. The block B forming the combined wedge and shoe is laterally enlarged, as indicated at 22, said laterally enlarged portion forming the friction shoe section of said block. The friction shoe section 22 has a pair of outer flat friction surfaces 23—23 which are angularly disposed with respect to each other and cooperate with two adjacent friction surfaces 20—20 of the casing A.

The friction shoes C—C are of like design. Each shoe is provided on the outer side thereof with a pair of angularly disposed, longitudinally extending friction surfaces, corresponding to the friction surfaces 23—23 of the shoe section of the block B and being also designated by 23—23. The shoes C—C, together with the section 22 of the block B, form three similar friction elements which are symmetrically arranged about the longitudinal, central axis of the mechanism, the pair of friction surfaces 23—23 of each friction element cooperating with two adjacent friction surfaces of the casing A. On the inner side, that is, the side nearest the central, longitudinal axis of the mechanism, each shoe is provided with a lateral enlargement 124 having a flat wedge face 24 inclined inwardly toward the axis of the mechanism. The block B is provided at its inner end with a pair of wedge faces 25—25, correspondingly inclined to and adapted to engage respectively with the wedge faces 24—24 of the two shoes C—C. The wedge faces 25—25 of the block B are arranged in planes at an angle of 60 degrees to each other and at equal angles to a plane coinciding with the central, longitudinal axis of the gear and bisecting the angle made by the friction surfaces 23—23 of the friction shoe section 22 of the block B. The combined wedge block and friction shoe B and the friction shoes C—C together form an expandible friction clutch which cooperates with the friction surfaces of the casing A, the friction clutch being thus, in effect, composed of three shoe members and a cooperating central wedge wherein one of the shoes is fixed to or rigid with the wedge and the wedge has wedging engagement with the remaining two shoes.

The main spring resistance D comprises a relatively heavy, outer coil 26 and a lighter inner coil 27 interposed between the rear end of the casing and the inner ends of the shoes C—C and block B, the rear end of the spring 26 bearing directly on the rear wall 17 of the casing A and the rear end of the spring 27 bearing on an inwardly projecting boss 28 on said wall. The shoes C—C and the shoe section 22 of the block B have transverse inner end faces 29—29—29 which bear on the outer end of the spring coil 26. These members also have inset rear abutment faces which form seats 30—30—30 on which the front end of the inner coil spring 27 bears.

The retainer bolt E, which serves to hold the mechanism assembled and of uniform overall length, has a head at the rear end thereof which is anchored to the boss 28 on the wall 17 of the casing A. The shank of the bolt E extends through an opening 31 in the block B. The block B is anchored to the bolt by means of a nut 32 threaded on the outer end of said bolt and seated in a pocket 33 of the block B.

In the operation of my improved friction shock absorbing mechanism, the yoke 14 pulls the casing A forwardly in draft compressing the mechanism against the front follower 15 which, at this time, is held stationary by engagement with the front stop lugs 11—11. During a buffing action, the front follower 15 is forced rearwardly by the coupler and the mechanism is compressed between the front follower 15 and the rear stop lugs 12—12, the casing A being held stationary by engagement with said stop lugs. During compression of the mechanism, the block B is forced inwardly of the casing A against the resistance of the springs 26 and 27. At the same time a wedging action is set up between the cooperating wedge faces 25—25 and 24—24 of the block B and the shoes C—C, spreading the shoes and the block apart, thereby expanding the friction clutch and forcing the friction surfaces of the block B and shoes C—C into tight frictional contact with the interior friction surfaces of the casing A. During this action, inward movement of the shoes is resisted by the springs 26 and 27. The frictional resistance created by the sliding action of the shoes C—C and the block B on the friction casing surfaces is augmented due to the tapered construction of the casing. When the actuating force is reduced, the wedging action is released and the springs 26 and 27 force the shoes C—C and the block B outwardly of the casing A. These springs thus act to restore the parts to their fully released position when the actuating force is removed. As will be evident, outward movement of the block B is finally arrested by the bolt E, thereby limiting outward movement of the shoes C—C which bear on the wedge faces of the block B.

Referring next to the embodiment of the invention illustrated in Figure 4, the construction is substantially the same as that described in connection with Figures 1, 2, and 3 with the exception that the friction surfaces of the casing A which cooperate with the friction surfaces 23—23 of the block B are disposed parallel to the longitudinal axis of the mechanism. The cooperating friction surfaces of the shoes C—C and the casing A are inclined with respect to said axis similarly to the corresponding friction surfaces described in connection with Figures 1, 2, and 3.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a casing having interior friction surfaces; of a three piece friction clutch comprising a pressure transmitting member and a pair of friction shoes, said member and each shoe having cooperating sets of engaging flat wedge faces, the faces of one set being disposed in a plane at an angle to the plane of the other set, said member and shoes having sliding frictional engagement with the friction surfaces of the casing; and means yieldingly opposing movement of said member and shoes inwardly of the casing.

2. In a friction shock absorbing mechanism, the combination with a casing having interior friction surfaces; of a block slidable lengthwise of the casing; a plurality of friction shoes slidable lengthwise of the casing and having wedging engagement with the block, said block projecting outwardly beyond the outer ends of the shoes and being adapted to receive the actuating force; and a spring within the casing bearing on said block, shoes, and casing and yieldingly opposing inward movement of said block and shoes with respect to the casing.

3. In a friction shock absorbing mechanism, the combination with a casing having interior friction surfaces; of a three piece friction clutch comprising a pressure transmitting member having a lateral inward enlargement of V-shaped transverse cross section presenting a pair of wedge faces on opposite sides thereof at an angle to each other and a pair of friction shoes in wedging engagement respectively with the wedge faces of said member, said member and shoes having friction surfaces slidingly engaging the friction surfaces of the casing; and means yieldingly opposing movement of said member and shoes inwardly of the casing.

4. In a friction shock absorbing mechanism, the combination with a casing having interior, inwardly converging friction surfaces; of a three piece friction clutch, each member of said clutch having sliding frictional contact with one of said friction surfaces, said three members comprising a pressure transmitting member having a pair of wedge faces thereon and a pair of friction shoes in wedging engagement respectively with the wedge faces of said pressure transmitting member; and means yieldingly opposing movement of said member and shoes inwardly of the casing.

5. In a friction shock absorbing mechanism, the combination with a casing; of a pressure transmitting member, said member and casing having cooperating friction surfaces disposed substantially parallel to the longitudinal axis of the mechanism; a pair of friction shoes in wedging engagement with said member, said shoes and casing having cooperating friction surfaces inclined with respect to the longitudinal axis of the mechanism; and means yieldingly opposing movement of said member and shoes inwardly of the casing.

EDWARD H. LEHMAN.